(12) United States Patent
Bucur

(10) Patent No.: US 11,053,702 B2
(45) Date of Patent: Jul. 6, 2021

(54) SWING CANCELING SYSTEM WITH GYROSTABILIZER FOR STRAND MOUNTED SMALL CELL BASE STATION

(71) Applicant: AT&T Mobility II LLC, Atlanta, GA (US)

(72) Inventor: Doru Cristian Bucur, Palatine, IL (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/587,626

(22) Filed: Sep. 30, 2019

(65) Prior Publication Data
US 2021/0095464 A1 Apr. 1, 2021

(51) Int. Cl.
| | |
|---|---|
| *H04W 88/08* | (2009.01) |
| *F16F 15/30* | (2006.01) |
| *H01Q 1/24* | (2006.01) |
| *H01Q 1/18* | (2006.01) |
| *E04H 9/02* | (2006.01) |
| *F16F 7/10* | (2006.01) |

(52) U.S. Cl.
CPC ............ *E04H 9/0215* (2020.05); *F16F 7/10* (2013.01); *F16F 15/30* (2013.01); *H01Q 1/18* (2013.01); *H01Q 1/246* (2013.01); *H04W 88/08* (2013.01)

(58) Field of Classification Search
CPC ... H04W 88/00; H04W 88/08; H04W 88/085; H04B 1/03; H04B 1/09; H04B 1/38; H01Q 1/246; H01Q 1/005; H01Q 1/18; F16F 7/10; F16F 15/30; E04H 9/0215
See application file for complete search history.

(56) References Cited

U.S. PATENT DOCUMENTS

| | | | |
|---|---|---|---|
| 8,897,933 B1 * | 11/2014 | Teller | B64B 1/00 701/15 |
| 2011/0309996 A1 * | 12/2011 | Abumrad | H01Q 1/24 343/872 |
| 2019/0359453 A1 * | 11/2019 | Al-Husseini | B66C 13/063 |

FOREIGN PATENT DOCUMENTS

WO   WO 2019/118116 A1   6/2019

OTHER PUBLICATIONS

"How Gyros Create Stabilizing Torque"; VEEM Gyro Ltd; Whitepaper 1403; 2014; 13 pages.

* cited by examiner

*Primary Examiner* — Philip Sobutka
(74) *Attorney, Agent, or Firm* — BakerHostetler

(57) ABSTRACT

A small cell base station adapted to be secured to a strand cable is provided with a flywheel and an electric motor to rotate the flywheel in an axis of rotation substantially perpendicular to the strand cable. The rotating flywheel acts as a gyrostabilizer to prevent swinging of the small cell base station due to wind.

16 Claims, 4 Drawing Sheets

SWING CANCELING SYSTEM WITH GYROSTABILIZER FOR STRAND MOUNTED SMALL CELL BASE STATION

TECHNICAL FIELD

The present disclosure relates to telecommunication base stations More particularly, the disclosure relates to a strand mounted small cell base station with a gyrostabilizer to cancel swing.

BACKGROUND

Cellular communications networks typically divide a geographic area into "cells," each of which is served by a base station. Network operators will deploy small cell base stations to fill coverage gaps and provide densification. A small cell base station is a base station has a lower range than typical base station.

Network operators plan to deploy 10 times the number of small cell base stations with the implementation of 5G. In deployment of small cell base stations, the network operators encounter a number of problems. These include requirements for site and equipment approvals; negotiation of fees with local government or other landlord; deployment and maintenance of the base station. One way to avoid the problems is to mount the small cell base stations on a strand attached between two utility poles. However, strand-mounted small cell base stations are susceptible to a traversal swing generated the force of the wind. The swing may affect the coverage and for PCS band (1900 MHz) where the wave length is about 15.8 cm, is sufficient to create problems.

SUMMARY

One general aspect includes an apparatus including a cell base station having a support member attached to a radio transmitter. The apparatus also includes an antenna attached to the support member. The apparatus also includes a strand mounting member attached to the support member adapted to be attached to an aerial strand cable. The apparatus also includes a power supply coupled to the cell base station. The apparatus also includes a gyrostabilizer mounted on the support member having a flywheel with an axis of rotation substantially perpendicular to the aerial strand and a motor connected to the power supply.

The apparatus may include a second radio transmitter attached to the support member and at least one additional antenna attached to the support member. A second gyrostabilizer may be provided in the form of a second flywheel with an axis of rotation substantially perpendicular to the strand cable. The flywheel has a mass and angular velocity sufficient to compensate for a torque generated by wind acting on the cell base station.

Another aspect includes a cell base station with: a support member, a plurality of radio transmitters attached to the support member, a plurality of antennas attached to the support member, a power supply coupled to the radio transmitters, a bracket attached to the support member adapted to be attached to an aerial strand, and a gyrostabilizer mounted on the support member having a flywheel with an axis of rotation substantially perpendicular to the aerial strand and a motor connected to the power supply.

Other embodiments may include a cell base station where the plurality of antennas includes four antennas. The cell base station may be provided with a housing disposed around the flywheel. The cell base station may be provided with a second flywheel. Another aspect may include a cell base station where the flywheel has a mass and angular velocity capable of generating a torque sufficient to compensate for the maximum torque generated by wind acting on the cell base station.

One general aspect includes a method of stabilizing a cell base station mounted on an aerial strand including generating a torque on the cell base station to cancel a wind generated torque exerted on the cell base station by wind.

Implementations may include one or more of the following features. The method where generating a torque on the cell base station includes rotating a flywheel along an axis substantially perpendicular to the aerial strand. The method further including: calculating a maximum torque that can be exerted by wind on the cell base station, and rotating a flywheel along an axis substantially perpendicular to the aerial strand where the flywheel has a mass and angular velocity sufficient to generate a torque to compensate for the maximum torque. The method where the step of generating a torque of the base cell station to cancel a wind generated torque includes. The method may also include disposing a flywheel having a predetermined mass on the base cell station. The method may also include rotating the flywheel along an axis substantially perpendicular to the aerial strand at an angular velocity sufficient to cancel the wind generated torque. The method further including: calculating a maximum torque that can be exerted by wind on the cell base station, disposing a flywheel having a predetermined mass on the base cell station, and rotating the flywheel along an axis substantially perpendicular to the aerial strand at an angular velocity sufficient to cancel the maximum torque the can be exerted by wind.

DETAILED DESCRIPTION OF ILLUSTRATIVE EMBODIMENTS

Figure 1:
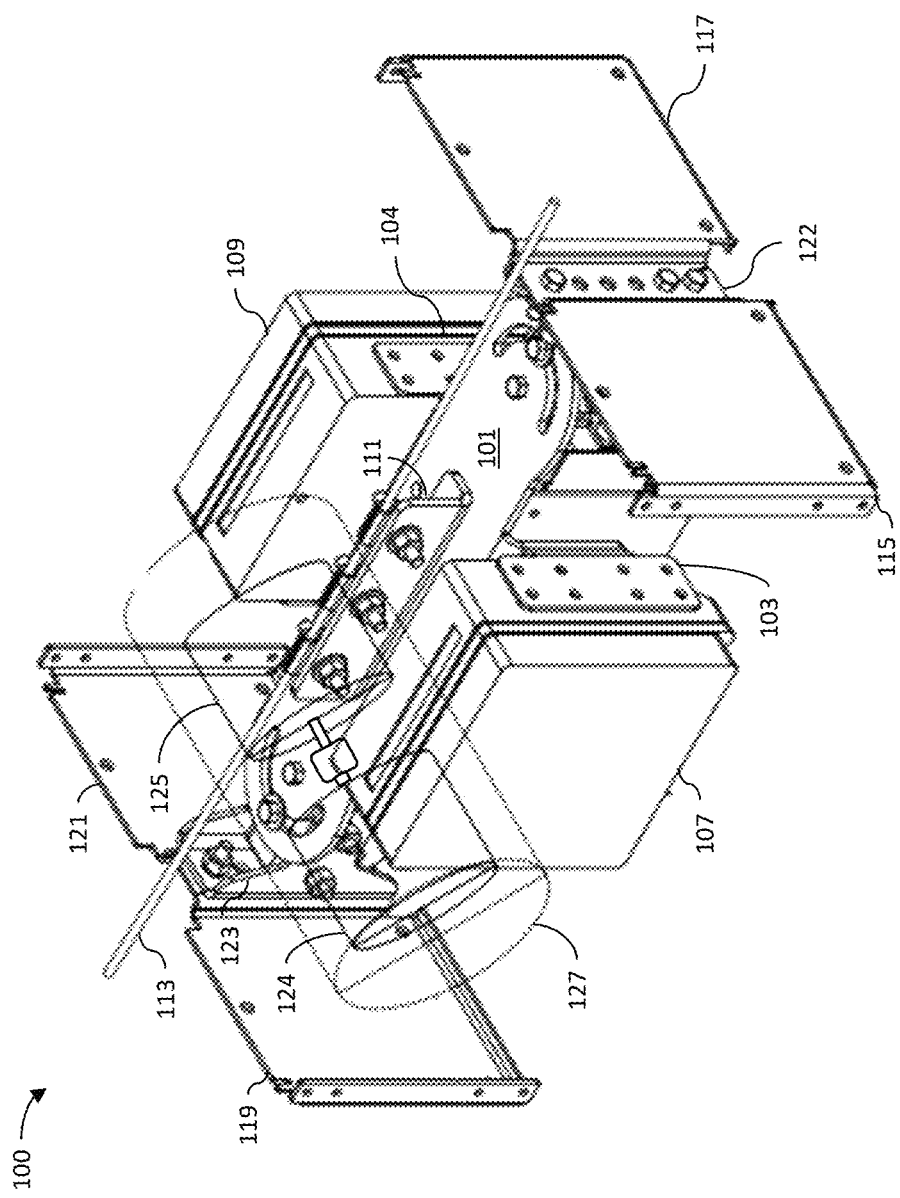
FIG. 1 is a perspective view of a small cell base station with a flywheel assembly.
Figure 2:
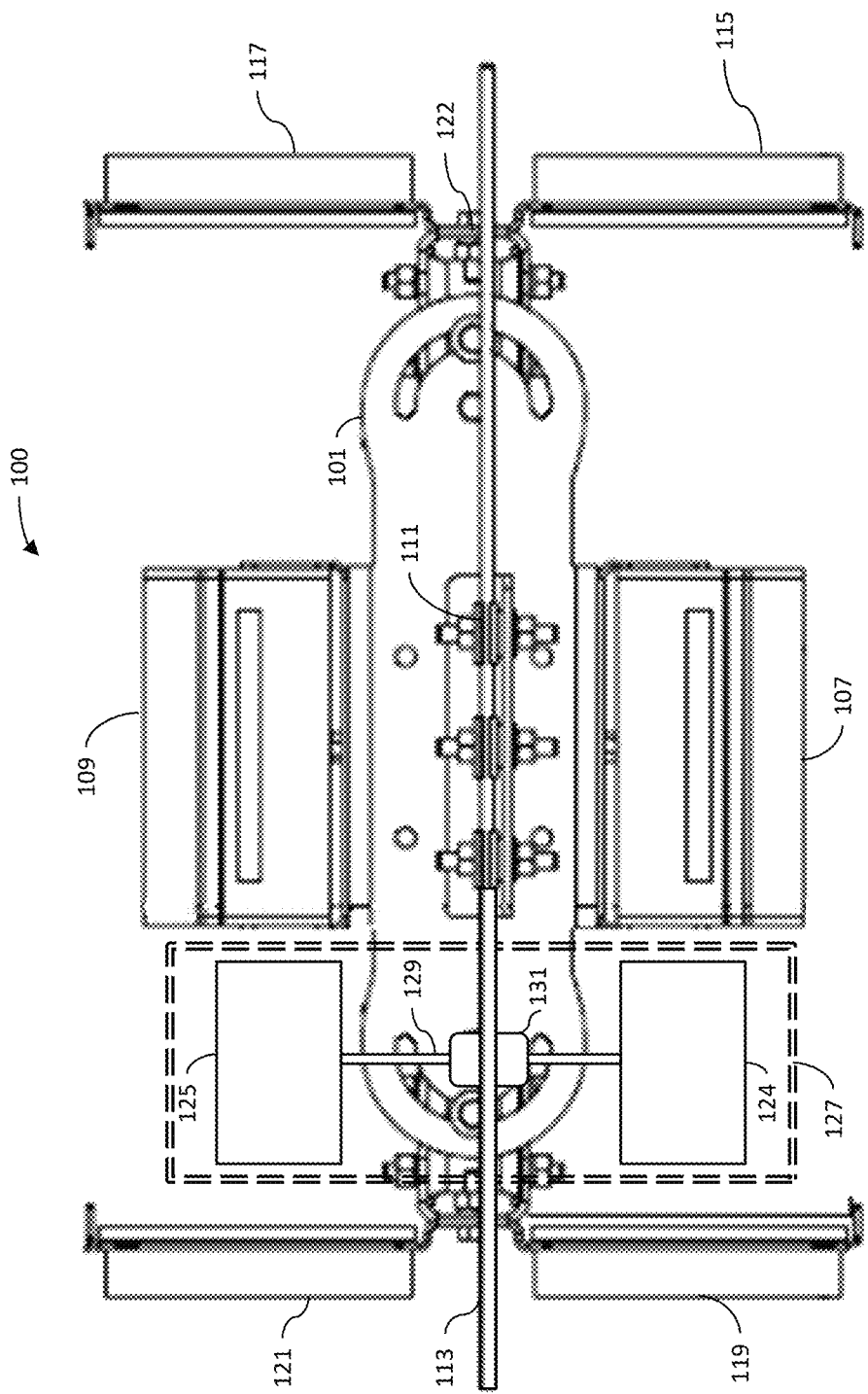
FIG. 2 is a top view of a small cell base station with a flywheel assembly.

Illustrated in FIGS. 1 and 2 is a stabilized strand mounted small cell base station (base station 100). Base station 100 includes a support member 101 and at least two mounting brackets 103 104, that secure radio transmitters 107 and 109. Base station 100 also includes a strand bracket 111 adapted to secure the base station 100 to a strand cable 113 disposed between two poles. The base station 100 also includes antennas 115, 117, 119, 121 secured to the support member 101 by an antenna bracket 122 and antenna bracket 123.

Wind may cause swaying of a base station 100 mounted on a strand cable 113. In order to resist and reduce the swaying motion, pork acting on the opposite direction to the wind and use swaying towards must be generated.

Figure 3:
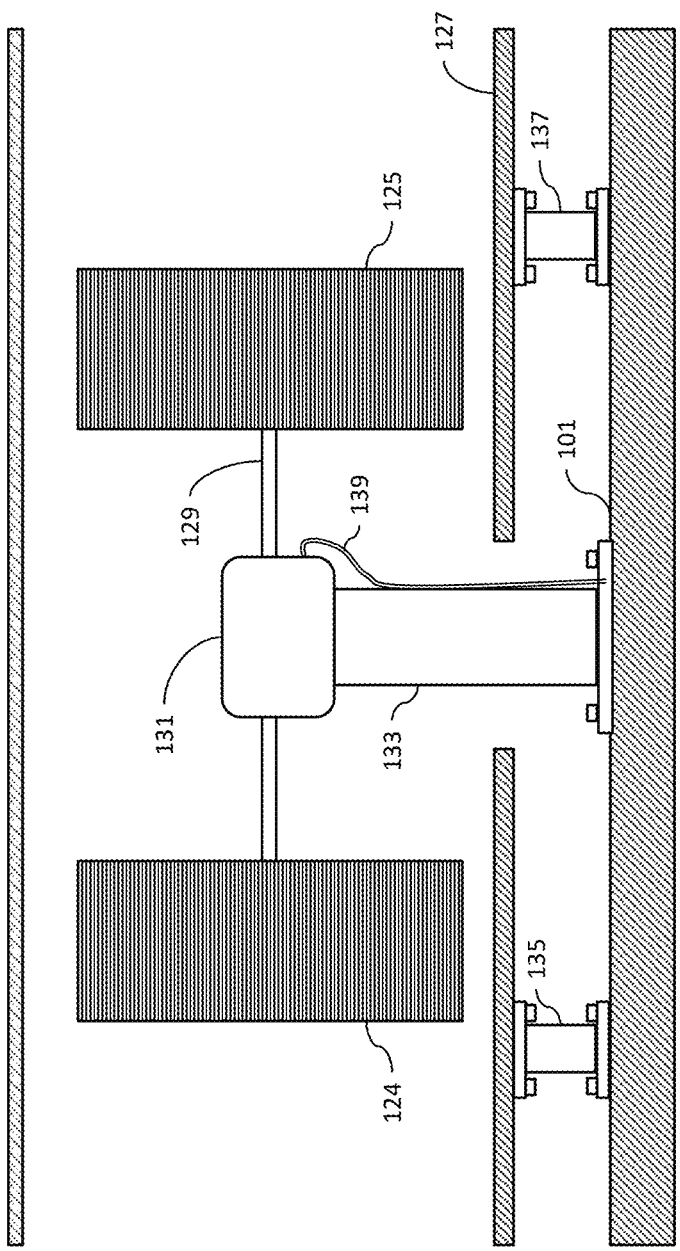
FIG. 3 is a cross-sectional view of the mounting of the flywheel assembly.

A gyrostabilizer comprising a pair of gyroscope flywheels 124 and 125 may be disposed on the base station 100 and secured to the support member 101. The flywheels may consist of a heavy circular disc/massive wheel fitted with a strong axle projecting on either side. The flywheels 124 and 125 may be a solid cylinder, or a cylindrical tube. The axle is mounted on ball bearings on two fixed supports. The base station 100 may also include a flywheel housing 127. As illustrated in FIGS. 2 and 3 the base station 100 also includes a motor 131 and a shaft 129 attached to flywheel 124 and flywheel 125. As shown in FIG. 3 the motor is mounted on the support member 101 by a motor mounting member 133. The housing 127 is mounted to the support member 101 by housing mounting members 135 and 137. Power is supplied to the motor 131 through electrical conduit 139.

Figure 4:
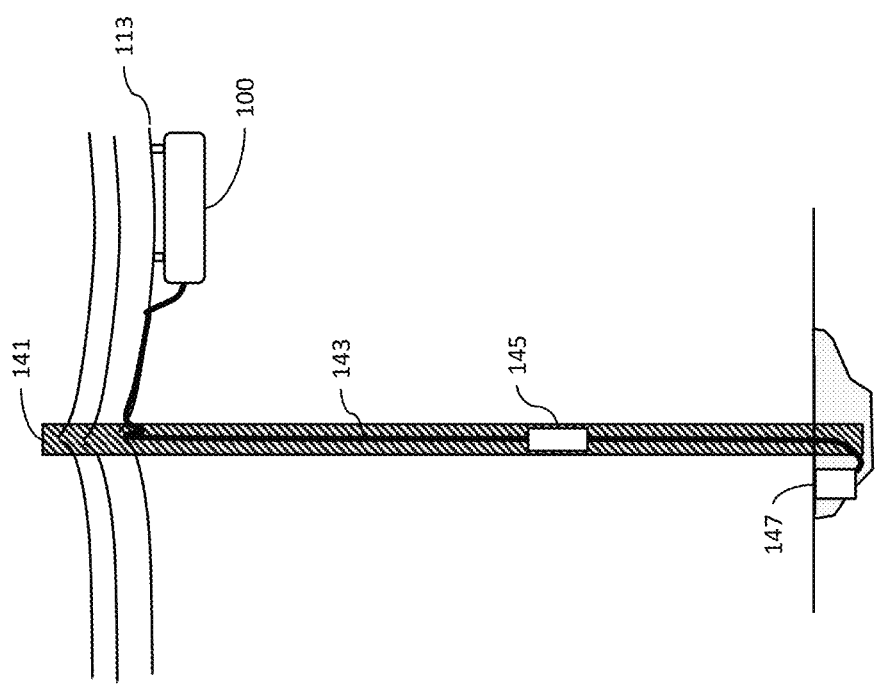
FIG. 4 is an illustration of a small cell base station mounted on a strand.

Illustrated in FIG. 4 is the base station 100 mounted on the strand cable 113 that is attached to a pole 141. Power supply to the base station 100 through electrical conduit 143. The poll may be provided with a meter 145 and a splice box 147 for underground fiber and power installation.

In operation, the electric motor 131 drives the rotation of flywheels 124 and 125 to maintain the orientation of the base station 100. When wind imparts a force on the base station 100 the flywheels act as a gyrostabilizer to prevent swaying of the base station 100. The mass of the flywheels and the angular velocity of the flywheel must be sufficient to compensate for the maximum torque generated by wind. The torque generated by the flywheels is equal to the angular momentum multiplied by the angular velocity. The torque may be expressed as follows:

$$\tau = J_{spin} \times W_{spin} \times W_{prec}$$

where $\tau$ is the gyrostabilizer torque;

$J_{spin}$ is the flywheel rotational moment of inertia about the spin axis (the moment of inertia of a solid cylinder is equal to ½ the mass of the cylinder times the square of the radius of the cylinder.)

$W_{spin}$ is the spin speed or spin angular velocity; and $W_{prec}$ is the precession angular velocity or precession rate. (Precession is a change in the orientation of the rotational axis of a rotating body).

When the flywheel is spun up to speed and the precession axis is locked, the flywheel has an angular momentum equal to the rotational inertia times the spinning speed. With the precession axis locked, no sway there is no stabilizing torque produced. Wind impacting the base station 100 would induce a swaying torque on the body of the base station 100. The swaying motion would depend on the wind speed, the mass distribution and shape of the base station 100. The angular role rate combines with the flywheel angular momentum to generate a precession torque on the flywheel in the base station swaying axis.

While the apparatus has been described, disclosed, illustrated and shown in various terms of certain embodiments or modifications which it has presumed in practice, the scope of the appended claims is not intended to be, nor should it be deemed to be, limited thereby. As will be recognized by those of ordinary skill in the pertinent art, numerous modifications and substitutions may be made to the above-described embodiment without departing from the scope of the invention.

What is claimed:

1. An apparatus comprising;
  a cell base station comprising:
    a support member;
    a radio transmitter attached to the support member;
    an antenna attached to the support member;
    a strand mounting member attached to the support member adapted to be attached to an aerial strand;
    a power supply coupled to the cell base station; and
    a gyrostabilizer mounted on the support member comprising a plurality of flywheels including a first flywheel with a first axis of rotation substantially perpendicular to the aerial strand and a motor connected to the power supply and a second flywheel positioned on an opposing side of the aerial strand as the first flywheel, wherein the second flywheel has a second axis of rotation substantially perpendicular to the aerial strand and the motor connected to the power supply.

2. The apparatus of claim 1 further comprising a second radio transmitter attached to the support member.

3. The apparatus of claim 1 further comprising at least one additional antenna attached to the support member.

4. The apparatus of claim 1 further comprising a housing disposed around the gyrostabilizer.

5. The apparatus of claim 1 wherein the aerial strand is a cable supporting other cables.

6. The apparatus of claim 1 wherein the plurality of flywheels has a mass and angular velocity sufficient to compensate for a torque generated by wind acting on the cell base station.

7. A cell base station comprising:
  a support member;
  a plurality of radio transmitters attached to the support member;
  a plurality of antennas attached to the support member;
  a power supply coupled to the radio transmitters;
  a bracket attached to the support member adapted to be attached to an aerial strand; and
  a gyrostabilizer mounted on the support member comprising a plurality of flywheels including a first flywheel with a first axis of rotation substantially perpendicular to the aerial strand and a motor connected to the power supply and a second flywheel positioned on an opposing side of the aerial strand as the first flywheel, wherein the second flywheel has a second axis of rotation substantially perpendicular to the aerial strand and the motor connected to the power supply.

8. The cell base station of claim 7 wherein the plurality of radio transmitters comprises two radio transmitters.

9. The cell base station of claim 7 wherein the plurality of antennas comprises four antennas.

10. The cell base station of claim 7 further comprising a housing disposed around the gyrostabilizer.

11. The cell base station of claim 7 wherein the aerial strand is a cable supporting other cables.

12. The cell base station of claim 7 wherein the plurality of flywheels has a mass and angular velocity generate a torque sufficient to compensate for the torque generated by wind acting on the cell base station.

13. A method of stabilizing a cell base station mounted on an aerial strand comprising generating a torque on the cell base station to cancel a wind generated torque exerted on the cell base station by wind, wherein generating the torque on the cell base station comprises rotating a plurality of flywheels including a first flywheel with a first axis of rotation substantially perpendicular to the aerial strand and a motor connected to the power supply and a second flywheel positioned on an opposing side of the aerial strand as the first flywheel, wherein the second flywheel has a second axis of rotation substantially perpendicular to the aerial strand and the motor connected to the power supply.

14. The method of claim 13 further comprising:
  calculating a maximum torque that can be exerted by wind on the cell base station,
  wherein the plurality of flywheels has a mass and angular velocity sufficient to generate a torque to compensate for the maximum torque.

15. The method of claim 13 wherein the plurality of flywheels is rotated at an angular velocity sufficient to cancel the wind generated torque.

16. The method of claim 13 further comprising:
calculating a maximum torque that can be exerted by wind on the cell base station,
wherein the plurality of flywheels is rotated at an angular velocity sufficient to cancel the maximum torque that can be exerted by wind.

* * * * *